United States Patent
Adendorff

(10) Patent No.: US 8,323,375 B2
(45) Date of Patent: Dec. 4, 2012

(54) METHOD OF OPERATING A CONVERTER AND APPARATUS FOR CARRYING OUT THE METHOD

(75) Inventor: Martin Adendorff, Eching (DE)

(73) Assignee: Linde AG, München (DE)

( * ) Notice: Subject to any disclaimer, the term of this patent is extended or adjusted under 35 U.S.C. 154(b) by 91 days.

(21) Appl. No.: 12/873,381

(22) Filed: Sep. 1, 2010

(65) Prior Publication Data

US 2011/0079109 A1 Apr. 7, 2011

(30) Foreign Application Priority Data

Sep. 3, 2009 (EP) .................................. 09011333

(51) Int. Cl.
C22B 9/00 (2006.01)
C22B 15/06 (2006.01)
C22B 13/00 (2006.01)
C22B 19/00 (2006.01)
C21B 11/00 (2006.01)

(52) U.S. Cl. ............... 75/414; 75/505; 75/641; 75/656; 75/696

(58) Field of Classification Search .................. 75/414, 75/505, 641, 656, 696
See application file for complete search history.

(56) References Cited

U.S. PATENT DOCUMENTS

| 4,045,215 | A | * | 8/1977 | Leroy et al. ..................... 75/628 |
| 4,544,141 | A | * | 10/1985 | Mackey et al. ............... 266/215 |
| 7,618,606 | B2 | * | 11/2009 | Fan et al. ..................... 423/230 |
| 2010/0242728 | A1 | * | 9/2010 | Radosz et al. .................. 95/106 |

* cited by examiner

*Primary Examiner* — Roy King
*Assistant Examiner* — Tima M McGuthry Banks
(74) *Attorney, Agent, or Firm* — Rankin, Hill & Clark LLP

(57) ABSTRACT

The present invention relates to a method of operating a converter, in particular a Peirce-Smith converter or a converter with similar design or mode of operation, and to an apparatus, for instance a plant, for carrying out the method. The method comprises the step of:

loading the converter with a starting material comprising said metal, the metal in the starting material being chemically bound at least in part to at least one compound substance, in particular sulphur;

maintaining a temperature within the converter interior space, which is above the melting temperature of the starting material; and supplying an oxygen-containing process gas into the converter interior space through injection nozzles arranged in the wall of the converter, the gas supplied through the injection nozzles comprising carbon dioxide, preferably very cold, technically pure carbon dioxide, as well as oxygen gas and/or air.

15 Claims, 3 Drawing Sheets

METHOD OF OPERATING A CONVERTER AND APPARATUS FOR CARRYING OUT THE METHOD

The present invention relates to a method of operating a converter, in particular a Peirce-Smith converter or a converter with similar design or mode of operation, and to an apparatus, for instance a plant, for carrying out the method.

PRIOR ART

Peirce-Smith converters (PSC) are horizontal converters which are used in the metallurgical production of copper. The starting material is the so-called copper matte which is obtained from a copper-bearing ore by means of preceding processing steps and comprises approximately 40% of copper. The copper matte contains, inter alia, iron sulfide and copper sulfide. In the Peirce-Smith converter, the sulphur is oxidized to give sulphur dioxide by injecting air into the glowing and liquid copper matte in a two-stage conversion process referred to as "fuming", and is discharged in the exhaust gas. In the first step of slag blowing, iron is bound to form slag and is removed, in the second step of refining the crude copper, comprising more than 98% of copper and residues of base and noble metals, is produced and founded.

The Pierce-Smith process is similar to the Bessemer method in steel production; historically seen, it is derived from the Bessemer method via several intermediate steps. In contrast to the Bessemer method, the air is not blown in from the bottom, but from the side, and the shape of the Peirce-Smith converter is horizontally elongated. The basic principle of the Pierce-Smith converter has been given some further developments, resulting in the Hoboken converter, for example.

The converter comprises an opening at its top, which serves for charging the copper matte and founding the crude copper and is never completely closed in operation. This is why the amount of intake air corresponds approximately to the amount of produced exhaust gas. A further optimization of the covering with the aim to limit the amount of intake ambient air would require substantial modifications of the process design.

The converter is supplied with air at several places via special injection nozzles (Tuyeres). The air produces bubbles which result in scabs on the surface of the molten mass and on the walls, in particular in the area surrounding the opening. This is also the area where slag and dust are deposited.

On the one hand, the air serves for supplying oxygen and, on the other hand, for cooling purposes. In the conventional methods using air, the amount of air for cooling the PSC is so high that there is always a surplus of oxygen.

The exhaust gas of the converter contains sulphur dioxide. With conventional converters, a sulphuric acid production plant is arranged downstream to produce sulphuric acid from the sulphur dioxide. Through this, the emissions of sulphur dioxide are to be minimized (controlled). The sulphuric acid production plants are large-scale process plants. The market for sulphuric acid is a limited one. Thus, the main purpose of these sulphuric acid production plants is to remove the sulphur dioxide in a controlled manner. In the article "Peirce-Smith Converting—another 100 years?", Thomas Price et al.; International Peirce-Smith Converting Centennial, TMS, 2009, a method is described on page 193 in which sulphur dioxide is operated in circulation in a Peirce-Smith converter plant.

The reactions proceeding in the converter are of exothermal nature. This is why the thermal load at the exit opening of the injection nozzles is high, and the thermal erosion of the refractory lining of the converter is particularly high in this area, compared to other areas. This might necessitate an early renewal of the lining. In the article "Operation of the Air Liquid Shrouded Injection (ALS™) Technology in a Hoboken Siphon Converter", Romeo U. Pagador et al.; International Peirce-Smith Converting Centennial, TMS, 2009, pages 367 ff., the use of a jacketed nozzle is described in which air enriched with oxygen is blown into the converter in a sheathing nitrogen stream.

In normal operation, the injection nozzles get clogged. Until now, the injection nozzles are cleared by mechanical impact. This is performed manually. To this end, a ball valve is opened and a puncher is pushed through it to remove the crust agglomerating on the nozzle.

BRIEF SUMMARY OF THE INVENTION

It is the object of the present invention to avoid the disadvantages of the prior art. In particular, one object of the invention is to provide a method of operating a Peirce-Smith converter, which is more efficient and can be controlled in an easier way.

At least a part of the afore-mentioned objects is achieved by the features of the independent claims. Preferred embodiments and further developments of the invention, which solve special subtasks, are the subject-matters of the sub-claims.

According to one aspect of the present invention, a method of operating a converter, preferably a Peirce-Smith converter or the like, for obtaining a metal, preferably copper, iron, lead and/or zinc, comprises the steps of:

loading the converter with a starting material comprising said metal, the metal in the starting material being chemically bound at least in part to at least one compound substance, in particular sulphur;

maintaining a temperature within the converter interior space, which is above the melting temperature of the starting material; and supplying an oxygen-containing process gas into the converter interior space through injection nozzles arranged in the wall of the converter, the gas supplied through the injection nozzles comprising carbon dioxide, preferably very cold, technically pure carbon dioxide, as well as oxygen gas and/or air.

The heat capacity of $CO_2$ is much larger than that of air. Therefore, the cooling function of $CO_2$ is better than that of air. Due to the better cooling effect of $CO_2$, a smaller amount of gas may be enough to cool the converter to a sufficient extent. A smaller amount of gas means fewer bubbles in the molten mass and hence fewer scabs. Moreover, the amount of oxygen can be reduced so that a surplus of oxygen can be reduced or even avoided.

Furthermore, pure oxygen is added to the $CO_2$ so that the oxygen demand of the copper matte can be covered in a particularly precise and effective manner. This does not exclude, however, that air is an additional constituent of the process gas.

Since the total amount of gas is substantially lower in the invention than in the prior art, the amount of oxygen in the gas is also higher than in the air. This is why oxygen is present with a higher partial pressure. This results in a better chemical conversion of the oxygen in the converter.

All in all, the Peirce-Smith converter exhibits a smaller amount of scabs, dust, bubbles and agglomerations around the opening. As the amount of supplied gas is smaller, the number of the injection nozzles (Tuyeres) can also be reduced. Moreover, the exhaust gas cleaning equipment can be made smaller. This effect is enhanced by the fact that the covering of the converter is not sealed which is why the amount of intake air corresponds approximately to the amount of produced exhaust gas.

$CO_2$ has a higher specific weight as compared with air. Despite of the lower amount, a higher impulse is maintained, alleviating or preventing a clogging of the injection nozzles. This applies, above all, in combination with a smaller number of injection nozzles. Due to the use of carbon dioxide gas and oxygen gas as the process gas, the need of a clearing process by mechanical impact can be reduced or even completely prevented.

Basically, the cooling effect in the Peirce-Smith converter represents the limiting factor. As the cooling performance is improved according to the invention, the production of the whole factory can be controlled in a better way. It is preferred that the $CO_2$ is very cold, i.e. as cold as technically feasible. The cooler the $CO_2$, the more effective is the cooling effect on the converter wall and the lining, and the lower is the demand for cooling gas.

In a preferred design, the method is distinguished in that the carbon dioxide in the process gas originates at least in part from the exhaust gas of the converter. In this way, the consumption of liquid $CO_2$ can be diminished and the efficiency of the plant can be improved.

In a preferred embodiment, the method comprises the further steps of: vaporizing liquid carbon dioxide, preferably utilizing heat energy comprised in the exhaust gas; and using the obtained carbon dioxide gas as a constituent of the process gas. During the operation of the converter, the carbon dioxide gas as a constituent of the process gas is required in an amount which varies over time. Thus, it is advantageous if it is stored in compact, i.e. liquid form, and provided in gaseous form according to demand. The exhaust gas has to be cooled in the course of its treatment. This can be carried out e.g. with heat exchangers which are operated with air, for example. The heated cooling air can be used for its part for vaporizing liquid carbon dioxide. The same applies if the heat exchangers are operated with cooling water. The heat exchange can also take place between the exhaust gas and $CO_2$ in a direct manner without any connecting heat transmitting medium. The efficiency of the plant can be improved by utilizing the heat energy comprised in the exhaust gas. As no additional heating system is required (except for starting up the plant from cold state), the profitability of the plant can be improved. Since the heated cooling medium used in the exhaust gas heat exchanger is again cooled down during the vaporization of the liquid carbon dioxide, the environmental burden can be reduced when the heat transfer medium is released into the environment.

In a preferred embodiment, the method comprises the further steps of: collecting the exhaust gas in an extraction hood; cooling the exhaust gas; cleaning the exhaust gas, preferably by an electrostatic filtering process and/or wet washing; drying the exhaust gas, in particular by extracting water from the exhaust gas stream; and liquefying sulphur dioxide gas comprised in the exhaust gas, preferably by further cooling down the exhaust gas to a temperature which is below the boiling point of sulphur dioxide, and extracting as well as preferably collecting the liquid sulphur dioxide from the exhaust gas stream. The cooling and cleaning steps during the treatment of the exhaust gas allow to liquefy the $SO_2$ comprised in the exhaust gas and bring it to further use such as in the production of sulphuric acid.

In a preferred embodiment, the method comprises the further steps of: vaporizing liquid oxygen, preferably utilizing heat energy comprised in the exhaust gas; and using the obtained oxygen gas as a constituent of the process gas. The exhaust gas has to be cooled in the course of its treatment. The efficiency of the plant can be improved by utilizing the heat energy comprised in the exhaust gas in vaporizing the liquid oxygen. As no additional heating system is required (except for starting up the plant from cold state), the profitability of the plant can be improved.

In a preferred embodiment, the method comprises the further steps of: compressing the exhaust gas; and liquefying carbon dioxide gas comprised in the exhaust gas, the exhaust gas during the step of compressing being compressed to a pressure at which the carbon dioxide does not freeze during the subsequent liquefying process. These steps allow the utilization of the carbon dioxide comprised in the exhaust gas. This allows to improve the profitability of the plant and to reduce the $CO_2$ emissions.

In a preferred embodiment, the method comprises the further steps of: intermediately storing liquid carbon dioxide obtained in the liquefying step in a buffer reservoir; and gasifying the liquid carbon dioxide temporarily stored in the buffer reservoir in order to be supplied to the injection nozzles as carbon dioxide gas, the buffer tank being preferably supplied with liquid carbon dioxide from a carbon dioxide tank if the filling level falls below a threshold value. In this way, the demand for carbon dioxide as a constituent of the process gas can be largely met from the exhaust gas by filling an intermediate storage tank from which the liquid $CO_2$ is withdrawn for renewed vaporization.

In a preferred embodiment, the step of liquefying the carbon dioxide comprises the sub-steps of: cooling down the exhaust gas to a temperature which is below the boiling point of carbon dioxide, preferably using the cold energy of the liquid oxygen which is vaporized during this step, and separating the liquid carbon dioxide. In this way, it is possible to perform a direct heat exchange between the $CO_2$ to be cooled and the oxygen to be heated. Both processes can be combined in one component. This can further improve the efficiency and profitability of the plant.

In a preferred embodiment, the method is distinguished in that the oxygen gas is admixed to the carbon dioxide gas which has been obtained in the vaporizing step. This results in a process gas comprising a mixture of carbon dioxide and oxygen. The mixture can be supplied to the converter in a collecting line.

In a preferred embodiment, the method is distinguished in that the carbon dioxide is extracted from the exhaust gas by pressure swing adsorption. This means that cooling the exhaust gas for separating the carbon dioxide would be unnecessary; the separated $CO_2$ could be collected in a pressure tank and stored for further use.

In a preferred embodiment, the method is distinguished in that the exhaust gas is cooled by air, in particular by air originating at least in part from the exhaust gas after removal of the liquid carbon dioxide, the heat energy required in the step of vaporizing the liquid carbon dioxide being preferably taken at least in part from the air which was used before for the purpose of cooling the exhaust gas. In this way, the heat energy comprised in the exhaust gas can be effectively used, on the one hand, for vaporizing the liquid carbon dioxide. On the other hand, the exhaust air which is cold after the separation of the liquid $CO_2$ can be used once more. Through this, the efficiency of the plant can be further increased.

In a preferred embodiment, the method is distinguished in that comparatively cold air is admixed to the exhaust gas, preferably in the region of the extraction hood. In this way, the temperature of the exhaust gases can be lowered from the start of the exhaust gas branch. The thermal load of the materials and the heat emission of the exhaust gas ducts can be reduced. Cooling the extraction hood is also possible. Conventionally, the covering of a Peirce-Smith converter is cooled with water. If an air cooling system is provided, it can support the water cooling system or even completely replace it.

In a preferred embodiment, the method is distinguished in that the carbon dioxide gas and the oxygen gas are introduced into the converter interior space in separate gas streams, this process of introducing gas into the converter interior space preferably occurring in such a manner that the oxygen gas stream is shielded with a carbon dioxide gas stream in each case. With a sheathing stream of this type, oxygen can be blown into the converter interior space, on the one hand, and the direct vicinity of the oxygen jet can be cooled, on the other hand. This is why the thermal abrasion of a lining material of the converter can be counteracted, and the lifetime of a converter lining can be prolonged. Further, $CO_2$ has advantages in terms of the handling and recovering it from the exhaust gas as compared to other cooling media such as nitrogen, and has a higher specific gravity and hence a higher impulse than nitrogen.

In a preferred embodiment, the method is distinguished in that several converters are operated in parallel, the converters being operated on a cyclic basis and staggered in time. Usually, a converter is operated in a discontinuous manner. One cycle of the method may be seen, for instance, in filling the converter with molten copper matte, fuming, preferably in two stages (slag blowing and refining), discharging the slag and discharging the crude copper. In case several converters are operated in parallel and the converters are operated on a cyclic basis and staggered in time, the post-processing of the exhaust gases in the sulphuric acid production plant can be carried out almost in a continuous way.

According to a further aspect of the invention, provision is made for an apparatus for smelting metal, preferably copper, iron, lead and/or zinc, comprising a converter, preferably a Peirce-Smith converter or the like, the apparatus being designed and adapted to carry out the steps of the method suggested above.

BRIEF DESCRIPTION OF THE DRAWINGS

Further aspects, advantages and features of the present invention will be apparent from the following description and the appended drawings of particularly preferred embodiments of the invention.

DESCRIPTION OF PREFERRED EMBODIMENTS

Figure 1:
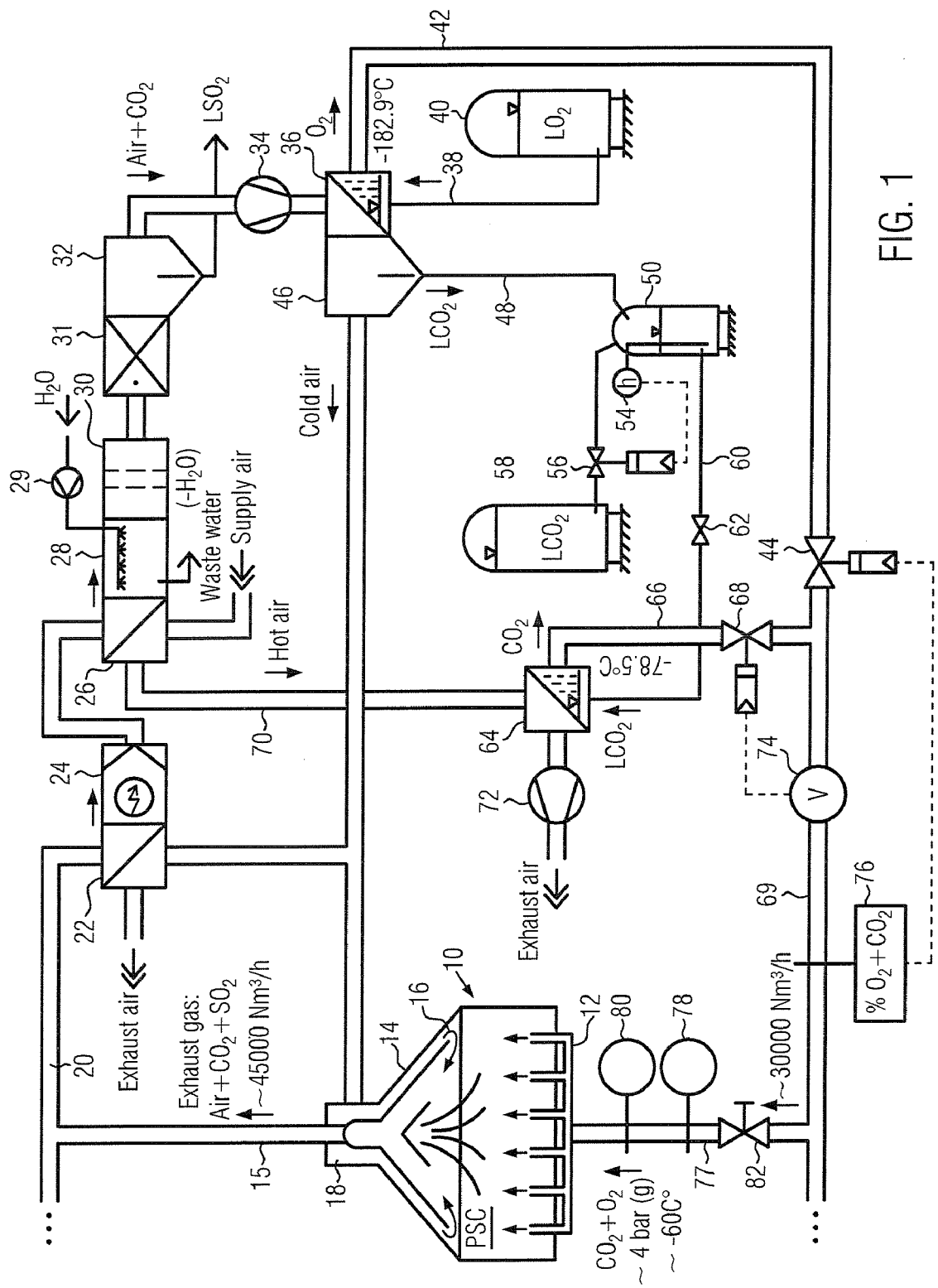
FIG. 1 is a schematic concept of a Peirce-Smith converter plant in a first embodiment of the invention.

A first embodiment of the invention will be explained below with reference to FIG. 1. FIG. 1 shows an exemplary embodiment of a converter plant according to the invention, with only one Peirce-Smith converter (PSC) 10 being schematically shown in the illustration. Further converters can be connected.

Provided in a side wall of the converter 10 is a series of injection nozzles in an injection nozzle arrangement 12, which open towards the interior space of the converter 10.

Although not shown in the Figure, the wall of the converter 10 is provided with a refractory lining. Arranged above the converter 10 is an extraction hood 14 opening into an exhaust gas line 15. The extraction hood 14 comprises a double wall through which air flows which is supplied to the lower region of the extraction hood 14 as an air curtain 16. The air required for this purpose is introduced via a cooling air connection 18 in the upper area of the extraction hood 14. Although not shown in more detail in the Figure, the extraction hood 14 is also capable of aspirating air from the environment. An additional water cooling system for the extraction hood 14 is conceivable, but not shown in more detail either.

The interior space of the converter (PSC) 10 is filled with a glowing and liquid copper-bearing copper matte in a discontinuous manner. The copper matte is obtained in foregoing steps from a copper-bearing ore and comprises, inter alia, iron sulfide and copper sulfide.

An oxygen-containing process gas is supplied to the interior space of the converter (PSC) 10 via the injection nozzle arrangement 12, with the aid of which the copper matte is refined. During this operation, the sulphur is dissolved from copper and other metals such as iron and is oxidized to give sulphur dioxide ($SO_2$). The major part of the iron is bound in slag which is poured off. Crude copper remains, having a high copper content and residues of base and noble metals.

The process gas also contains carbon dioxide ($CO_2$). The carbon dioxide, preferably technically pure, very cold carbon dioxide, serves for cooling the converter.

In addition to air, the exhaust gas of the converter also comprises sulphur dioxide ($SO_2$) and carbon dioxide. Both gases are extracted from the exhaust gas by degrees, as will be explained in detail below.

The exhaust gas line 15 of the PSC 10 opens into an exhaust gas collecting line 20 to which further exhaust gas lines of other converters (not shown in more detail) are connected. The exhaust gas is first cooled in a heat exchanger 22 and freed from floating particles, dust etc. in an electrostatic filter 24. Thereupon, the exhaust gas is cooled in a further heat exchanger 26 and washed in a water wall filter or wet filter 28. The wet filter 28 is supplied with water via a water pump 29. The collected waste water may be further used as a washing solution, or it can be discharged when harmful substances have been removed.

Depending on the gas composition, further cooling and/or cleaning stages can be provided which are, however, not shown in more detail here.

The pre-cooled and filtered exhaust gas is supplied to a drying apparatus 30 in which water is removed. As schematically outlined in the Figure, the drying apparatus 30 can be an adsorption-based dehumidifier, a device with another operating principle or a complex system with several stages.

Subsequently, the exhaust gas is cooled in an electric cooling unit 31 to such an extent that the $SO_2$ is liquefied (i.e. at least below the boiling point of $SO_2$ which is at $-10°$ C.). The liquefied sulphur dioxide can be stripped in a separator 32 in a residue-free manner. The stripped liquid sulphur dioxide ($LSO_2$=liquid $SO_2$) is collected in containers (not shown in more detail), or is put to further use through a pipeline, preferably in a plant for producing sulphuric acid, or is sold directly.

What is left is the exhaust gas consisting essentially of air and $CO_2$. The residual exhaust gas is compressed by means of a compressor 34 so that liquid $CO_2$ is produced in the subsequent cooling process: Carbon dioxide snow would be the result without any cooling. The liquefaction is performed, for instance, by heat exchange. The liquefaction process can be carried out with the support of the liquid oxygen ($LO_2$) which extracts heat energy from the residual exhaust gas via a heat exchanger 36 and is vaporized in this process. Thus, the heat exchanger 36 acts, on the one hand, as a liquefying means for the $CO_2$ in the exhaust gas and, on the other hand, as a vaporizer unit for the liquid oxygen. The heat exchanger ($CO_2$-liquefying means) 36 and the compressor 34 can be integrated in one apparatus.

The liquid oxygen is supplied to the heat exchanger 36 from an $LO_2$-container 40 through an $LO_2$-line 38, is heated in the heat exchanger 36 at least to the boiling point of oxygen (−182.9° C.) and exits the heat exchanger 36 in the form of oxygen gas through an $O_2$ (gas) line which can be controlled by a valve ($O_2$ valve) 44. The $CO_2$ which has been liquefied in the heat exchanger 36 is separated in a separator 46 and collected in an $LCO_2$-buffer reservoir 50 via an $LCO_2$-separator line 48.

The cold air left in the $CO_2$ liquefying process is used for cooling purposes. That is to say, the cold air is supplied to the cooling air connection 18 of the extraction hood of the converter 10 and to the first heat exchanger 22 via a cooling air line 52. Instead of branching to the cooling air connection 18 and the heat exchanger 22, as illustrated in the Figure, the cooling air line 52 first can extend through the heat exchanger 22 and extend from there to the cooling air connection 18 of the converter 10.

The filling level of the $LCO_2$-buffer reservoir 50 is monitored by means of a filling level detector 54. The filling height h can be determined indirectly, e.g. by weighing or other methods. When the filling level is low, the $LCO_2$-buffer reservoir 50 can be supplied with liquid carbon dioxide ($LCO_2$) via a valve ($LCO_2$-inflow valve) 56 from an $LCO_2$-storage container 58. For this, the filling level measured by the filling level detector 54 is fed to a controller which is coupled to the actuating element of the valve 56. When the filling level is low, the valve 56 opens and makes liquid $CO_2$ flow from the storage container 58 into the buffer reservoir 50 until a prescribed target level is achieved. Such a phase of refilling may be required in particular during starting up the plant when carbon dioxide from the exhaust gas is not yet available. Possible losses in the process can be balanced in this way, too.

In case of need, the liquid carbon dioxide stored in the buffer reservoir 50 is withdrawn through an $LCO_2$-line 60 which can be controlled by a valve ($LCO_2$-valve) 62, is vaporized by means of a $CO_2$-vaporizer unit 64 and flows from the latter into a $CO_2$-line 66 which can be controlled by a valve ($CO_2$-valve) 68. Downstream of the $CO_2$-valve 68 and the $O_2$-valve 44, the $CO_2$-line 66 and the $O_2$-line 44 unite to a common process gas distribution line 69.

The vaporization of the liquid carbon dioxide in the $CO_2$-vaporizer unit 68 is carried out according to the heat exchange principle with warm air which is introduced via a hot air line 70 from the second (exhaust gas) heat exchanger 26, after having cooled down the exhaust gas there. A blower 72 aspirates supply air through the $CO_2$-vaporizer unit 64, the hot air line 70 and the heat exchanger 26 and discharges it again into the environment as outlet air. Alternatively, the heat exchanger 26 and the $CO_2$-vaporizer unit 64 can also be integrated in a single apparatus as is the case with the $O_2$-vaporizer unit 36. It is also possible to use a bypass flow of the exhaust gas for vaporizing the liquid carbon dioxide.

The volume flow in the process gas distribution line 69 is measured by a flow meter 74. The opening state of the $CO_2$-valve 68 is controlled as a function of the output signal of the flow meter 74. Further, the gas composition in the process gas line 69, i.e. the ratio of oxygen and carbon dioxide on a percentage basis, is determined by a gas analyzer 76. The opening state of the $O_2$-valve 44 is controlled as a function of the output signal of the gas analyzer 74. In this way, the amount of gas and the gas composition can be automatically adjusted.

A process gas line 77 branches off from the process gas distribution line 69 and extends to the injection nozzle arrangement 12 of the Peirce-Smith converter 10. The process gas distribution line 69 extends to further converters (not shown in more detail) in the plant. A temperature sensor 78 and a pressure gauge 80 are arranged in the process gas line 77. In a control device which is not shown in more detail, the parameters of the process gas can be evaluated and used for determining target values for the volume flow and the composition of the process gas. In the example which is illustrated, the set-point values for the temperature and pressure of the process gas are at 0° C. and 10 bar (o), respectively, but can be adapted as required to the circumstances and specific conditions prevailing in each case. The process gas line 77 for the converter 10 can be shut off in a controlled manner by means of a valve 82.

The state variables of the carbon dioxide, i.e. its purity, flow rate, pressure and temperature, require a close monitoring in order to prevent any condensation or resublimation in the pipe installation.

As already explained, several converters 10 are provided in the plant, but only one of them is shown. The converters operate in a discontinuous and cyclic manner. The procedure from filling in the glowing and liquid copper matte until founding the crude copper can be seen as one cycle of a converter 10. Each converter 10 is cleaned and inspected between the cycles to be able e.g. to discover and repair a damaged refractory lining early enough. In order to allow a quasi-continuous operation of the plant, the cycles of the individual converters begin so as to be staggered in time.

In the exemplary embodiment illustrated above, the flow-measuring device (the flow meter) 74 and the gas analyzer 76 are provided in the process gas line so as to be shared for all converters in the plant. In this arrangement, the central control device (not shown in more detail) can determine target values on the basis of the total demand. The temperature sensor 78 and the pressure gauge 80 are, however, provided in the individual process gas line 77 of the converter 10 to take account of the individual conditions in the converter. It is conceivable to provide only one temperature sensor 78 and one pressure gauge 80 in the process gas distribution line 69.

For the purpose of a finer and individual adjustment of the process gas for each converter provided in the plant, it is also possible that the $O_2$-line 44 and the $CO_2$-line 68 along with all mountings and measuring instruments are separately provided for each converter. Such an arrangement is shown as a second embodiment in FIG. 2.

Figure 2:
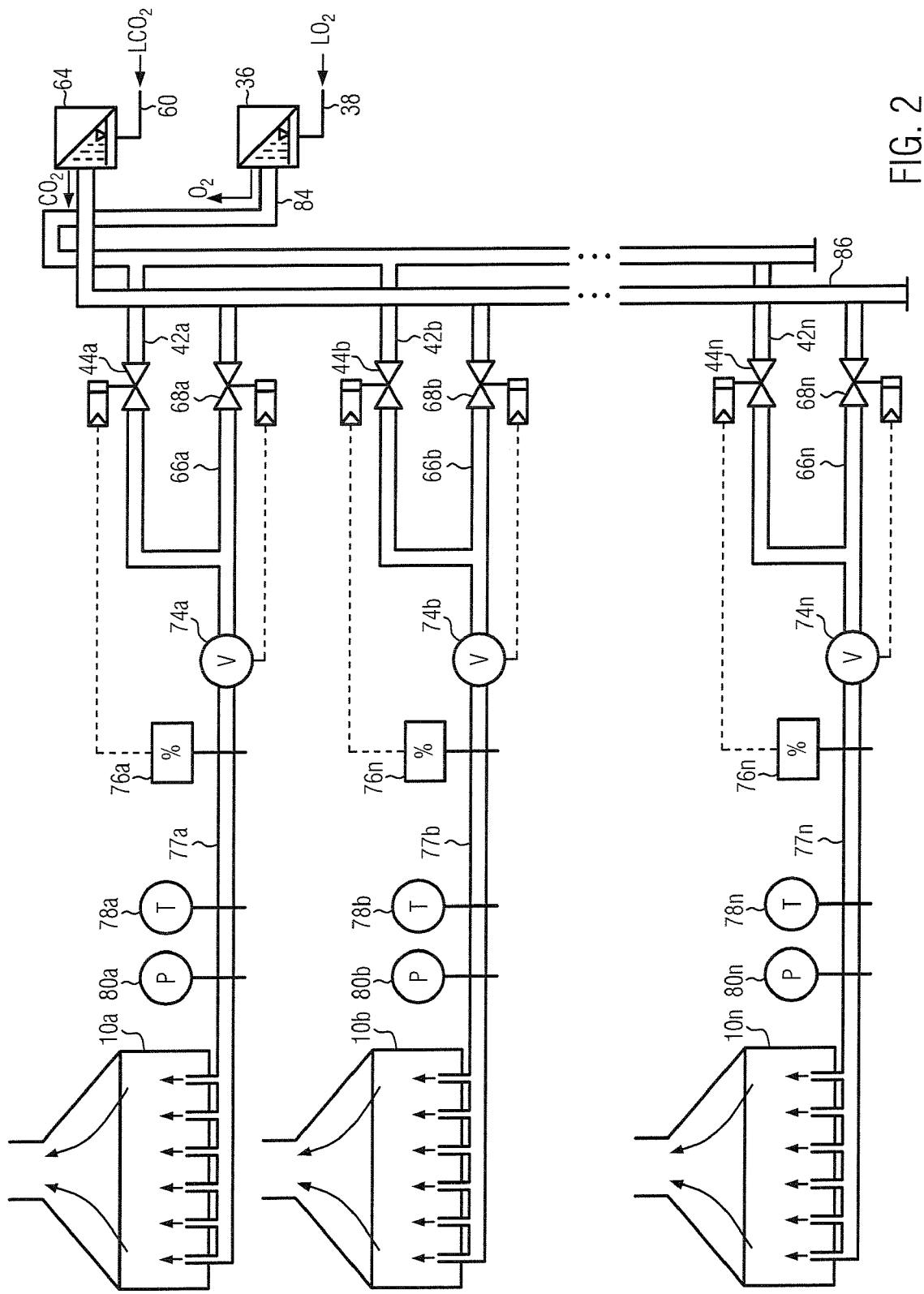
FIG. 2 is a schematic concept of a process gas side of a Peirce-Smith converter plant in a second embodiment of the invention.

In FIG. 2, only the process gas side of the plant is schematically illustrated; the exhaust gas side corresponds to the illustration of the first embodiment in FIG. 1.

According to the illustration in FIG. 2, several converters 10a, 10b, ..., 10n are provided in a converter plant. Each of the converters has an individual process gas line 77a, 77b, ..., 77n associated to it, in which a flow meter 74a, 74b, ..., 74n, a gas analyzer 76a, 76b, ..., 76n, a temperature sensor 78a, 78b, ..., 78n and a pressure gauge 80a, 80b, ..., 80n are provided in each case.

As in the first embodiment, an $O_2$-vaporizer unit 36 and a $CO_2$-vaporizer unit 64 are provided here, too. In this arrangement, however, an $O_2$-distribution line 84 branches off from the $O_2$-vaporizer unit 36; from this $O_2$-distribution line, an $O_2$-gas line 42a, 42b, ..., 42n, which can be individually controlled by a valve ($O_2$-valve) 44a, 44b, ..., 44n, branches out for each converter 10a, 10b, ..., 10n. Similarly, a $CO_2$- distribution line 86 extends from the $CO_2$-vaporizer unit 64 and branches out into $CO_2$-gas lines 66a, 66b, ..., 66n which lead to one converter 10a, 10b, ..., 10n each and can be individually controlled by a valve ($CO_2$-valve) 68a, 68b, ..., 68n. The gas lines 42a, 42b, ..., 42n and 66a, 66b, ..., 66n merge in the process gas lines 77a, 77b, ..., 77n in each case. The valves are driven individually for each leg on the basis of the criteria explained above with respect to the arrangement according to the first embodiment.

The other design of the plant, in particular the treatment of the exhaust gas and the overall process of the converter method, is equal to the first embodiment. A repeated explanation is omitted to avoid any repetitions.

Figure 3:
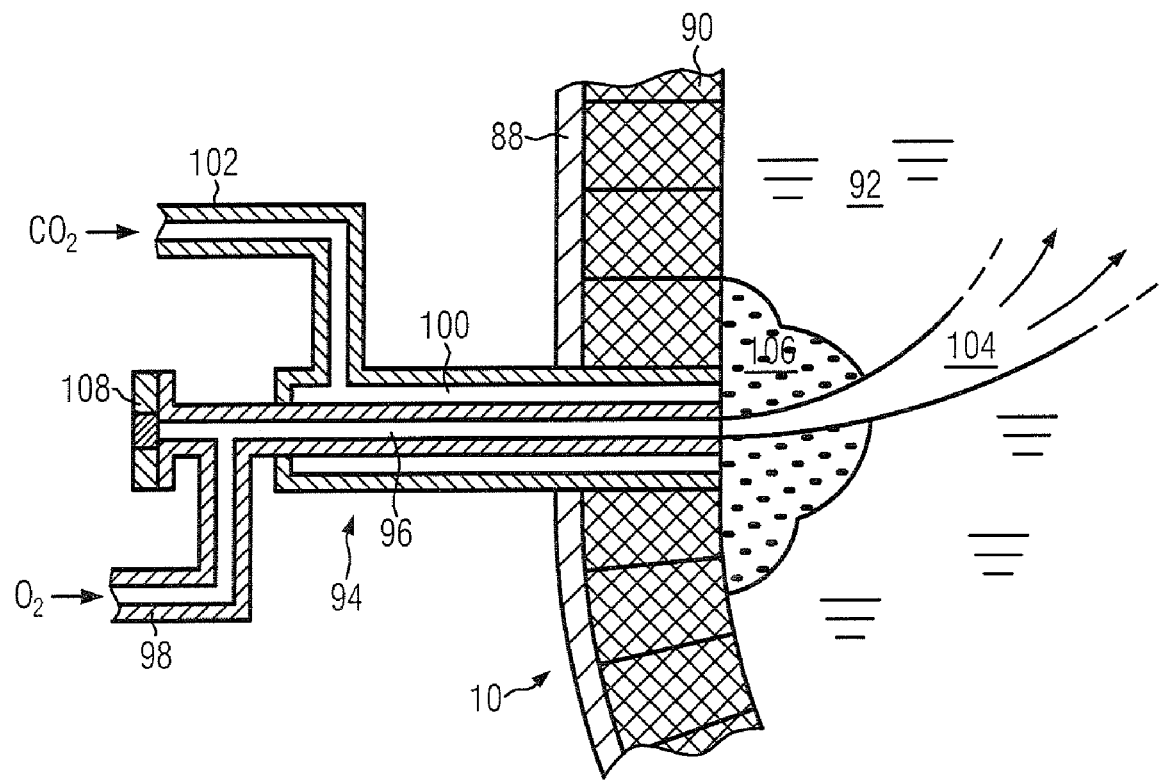
FIG. 3 is a schematic sectional view of a sheathing stream injection nozzle in operation in a third embodiment of the invention.

In a modification, oxygen and carbon dioxide can be separately fed into the converter 10. A particularly advantageous embodiment of this option is shown in FIG. 3 as a third embodiment of the invention. In this third embodiment, the oxygen gas and carbon dioxide gas are separately fed into the converter interior space through jacketed nozzles in such a way that the oxygen gas is shielded by a sheathing of carbon dioxide. FIG. 3 shows a jacketed nozzle in the longitudinal section in a portion of the converter wall, as well as its mode of operation.

According to the illustration in FIG. 3, the converter 10 comprises a wall 88 which is provided with a lining 90. The lining 90 consists, for instance, of an arrangement of refractory bricks. The molten copper matte 92 is in the interior space of the converter which is confined by the lining 90.

Inserted in the converter wall 88 is a plurality of sheathing flow injection nozzles 94, one of these being shown in the Figure in longitudinal section with a portion of the converter wall 88. The sheathing flow injection nozzle 94 extends through the converter wall 88 and the lining 90 and opens at the inner bordering thereof. The sheathing flow injection nozzle 94 comprises an inner tube 96 which is coupled to an oxygen gas port 98. The oxygen gas ($O_2$) which is supplied enters the copper-matte molten mass 92 in the form of a jet 104 at the opening end, is distributed in this area and fulfils the functions according to the process. The inner tube 96 is surrounded by a jacketed tube 100 which is in connection with a carbon dioxide gas port 102. The supplied carbon dioxide gas ($CO_2$) surrounds the $O_2$-jet 104 in the form of a sheathing, enters the copper-matte molten mass 92 at the opening end and effectively cools the converter wall 88, the lining 90 and hence at least indirectly the copper-matte molten mass 92 in the direct surrounding of the outlet opening of the sheathing flow injection nozzle 94 and is then mixed with the $O_2$-jet 104. A loose and porous agglomeration 106 of solidified, quasi foamed copper matte forms around the outlet opening, which in the region of the opening end of the nozzle 94 is blown away by the $O_2$-jet 104 and the $CO_2$ contained therein, but deposits around the outlet opening of the nozzle 94 on the lining 90 and forms an additional protective layer which prevents a thermal erosion of the lining 90 at this particularly vulnerable spot.

The rear end of the sheathing flow injection nozzle 94 comprises a closure 108 which—if necessary—is removable and allows a cleaning of the nozzle by mechanical impact. Moreover, the closure 108 may comprise an inspection window for observation. Instead of the closure 108, a ball valve can be provided which is cleaned by mechanical impact.

Preferred exemplary embodiments have been explained above on the basis of the Figures. Further modifications may relate to specific details of the method without relating to the gist and the applicability of the invention.

According to a deteriorated embodiment, $CO_2$, oxygen and air can be supplied. The larger the amount of air, the larger the loss of efficiency. The supply of $CO_2$, however, always results in an improvement with respect to conventional methods.

In a modification it is also possible to supply $CO_2$ and/or oxygen to the Peirce-Smith converter in liquid form. The vaporizer unit(s) 36/64 may be dispensed with in this case.

As the plant is usually operated with several converters on a cyclic basis and staggered in time, a sufficient amount of exhaust gas should also always circulate between the cycles of an individual converter to provide the required heat energy for vaporizing the oxygen and carbon dioxide in the vaporizer units 36 and 64. If, however, the entire plant is to be started from full standstill, the vaporizer units 36 and 64 can comprise additional heating means such as an electric heating system or a hot water based heating system to produce the process gas in this phase.

In quasi-continuous operation and under full load, the buffer reservoir 50 may be bypassed in order to supply the $CO_2$, taken from the exhaust gas stream, to the process in a direct manner. If too many converters are out of operation, the process of blowing in $CO_2$ via the valve 62 can be stopped and the buffer reservoir 50 can be filled with liquid $CO_2$. Returning the medium from the buffer reservoir 50 to the storage container 58 is conceivable, too. In case the buffer reservoir 50 (and possibly the storage container 58) is full, the oxygen supply can be stopped so that air is only aspirated via the extraction hood 14. In this case, the heat exchangers 36, 64 are deactivated and the exhaust gas is discharged into the environment through a chimney.

In case of a problem in the operation of the plant, the exhaust gas compressor can feed compressed air to the system to maintain an emergency operation without supplying $CO_2$. In The $CO_2$-liquefying means will be deactivated in this case.

The exhaust gas side branch up to the point of removing $SO_2$ is shown exemplarily and schematically to a great extent. The number of the cooling stages, the modalities in terms of the cleaning, filtering, cooling and drying means and the recovery of $SO_2$ and $CO_2$ from the exhaust gas are optional and can be modified on the basis of expert knowledge and skills. The storage, production, treatment and routing of the process gas and its components can be handled in different way, too.

It could be possible, for instance, to accumulate the $CO_2$ by means of pressure change adsorption (vacuum pressure change adsorption, if applicable) and to discharge the remaining air (adsorption). In this case, no further cooling process would be required, and no preceding compression either. As a cooling process by liquid oxygen would not be required, the oxygen could also be provided in gaseous state. The $CO_2$ required for the process would be provided in a second container (desorption). In this manner, desorption and adsorption could occur alternately.

It is also possible in the context of the invention to use a high-temperature membrane for separating $CO_2$ from the exhaust gas, instead of employing a pressure change adsorption method.

Cooling the extraction hood by the cold, compressed air as well as the use for cooling the exhaust gas are optional.

The invention is not only applicable to the conversion of copper-bearing copper matte and to a Peirce-Smith converter. Advantages may be offered by any application in which an oxygen-containing process gas is blown into a metal-bearing molten mass to oxidize disturbing components and remove them from the molten mass in this way. The method can be used in particular for metallurgical processes, especially conversion processes in the production of iron, lead or zinc.

List of Reference Numerals
- 10 converter (10a, 10b, . . . , 10n)
- 12 injection nozzle arrangement
- 14 extraction hood (covering)
- 15 exhaust gas line
- 16 air curtain
- 18 cooling air connection
- 20 exhaust gas collecting line
- 22 heat exchanger I
- 24 electrostatic filter
- 26 heat exchanger II
- 28 wet filter
- 29 water pump
- 30 drying apparatus
- 31 cooling unit
- 32 $SO_2$-separator
- 34 compressor
- 36 $O_2$-vaporizer unit
- 38 $LO_2$-line
- 40 $LO_2$-storage container
- 42 $O_2$-line (42a, 42b, . . . , 42n)
- 44 $O_2$-valve (44a, 44b, . . . , 44n)
- 46 $CO_2$-separator
- 48 $LCO_2$-separator line
- 50 $LCO_2$-buffer reservoir
- 52 cooling air line
- 54 filling level detector
- 56 $LCO_2$-inflow valve
- 58 $LCO_2$-storage container
- 60 $LCO_2$-line (60a, 60b, . . . , 60n)
- 62 $LCO_2$-valve
- 64 $CO_2$-vaporizer unit
- 66 $CO_2$-line (66a, 66b, . . . , 66n)
- 68 $CO_2$-valve (68a, 68b, . . . , 68n)
- 69 process gas collecting line
- 70 hot air line
- 72 blower
- 74 flow meter (74a, 74b, . . . , 74n)
- 76 gas analyzer (76a, 76b, . . . , 76n)
- 77 process gas line (77a, 77b, . . . , 77n)
- 78 temperature sensor (78a, 78b, . . . , 78n)
- 80 pressure gauge (80a, 80b, . . . , 80n)
- 82 cut-off valve
- 84 $O_2$-distribution line
- 86 $CO_2$-distribution line
- 88 converter wall
- 90 lining
- 92 copper matte-molten mass
- 94 jacketed injection nozzle
- 96 inner tube
- 98 $O_2$-port
- 100 jacket tube
- 102 $CO_2$-port
- 104 $O_2$-jet
- 106 porous agglomerations
- 108 closure Special reference is made to the fact that the above list of reference numerals forms an integral part of the description.

The invention claimed is:

1. A method of operating a converter in the production of a metal selected from the group consisting of copper, iron, lead and zinc, comprising the steps of:
  loading the converter with a starting material comprising said metal, the metal in the starting material being chemically bound at least in part to sulfur;
  maintaining a temperature within a converter interior space, which is above the melting temperature of the starting material; and
  supplying an oxygen-containing process gas into the converter interior space through injection nozzles arranged in the walls of the converter,
  wherein the process gas supplied through the injection nozzles comprises (a) carbon dioxide, and one selected from the group consisting of (b) oxygen and (c) air,
  wherein an exhaust gas is produced, which exhaust gas comprises sulfur dioxide and carbon dioxide, and
  wherein at least a portion of the carbon dioxide in the process gas originates from the exhaust gas of the converter.

2. The method of claim 1, wherein the converter is a Peirce-Smith converter.

3. The method according to claim 1, further comprising:
  vaporizing liquid carbon dioxide, using heat energy of the exhaust gas; and
  using the obtained carbon dioxide gas as a constituent of the process gas.

4. The method according to claim 3, further comprising:
  collecting the exhaust gas in an extraction hood;
  cooling the exhaust gas;
  cleaning the exhaust gas;
  drying the exhaust gas; and
  liquefying sulfur dioxide gas present in the exhaust gas, by further cooling the exhaust gas to a temperature which is below the boiling point of sulfur dioxide, and extracting the liquid sulfur dioxide from the exhaust gas stream.

5. The method according to claim 3, wherein the exhaust gas is cooled by air originating at least in part from the exhaust gas after removal of the liquefied carbon dioxide, wherein the heat energy required to vaporize the liquefied carbon dioxide is taken at least in part from the air which was used before for cooling the exhaust gas.

6. The method according to claim 1, further comprising vaporizing liquid oxygen to obtain oxygen gas, and using the obtained oxygen gas as a constituent of the process gas.

7. The method according to claim 1, further comprising compressing the exhaust gas to a pressure at which carbon dioxide does not freeze, and liquefying carbon dioxide gas contained in the exhaust gas.

8. The method according to claim 7, further comprising storing the liquefied carbon dioxide in a buffer reservoir; and gasifying said liquefied carbon dioxide in order to be supplied to the injection nozzles as a vaporized carbon dioxide gas.

9. The method according to claim 8, the oxygen gas is admixed to the vaporized carbon dioxide gas.

10. The method according to claim 7, wherein liquefying the carbon dioxide comprises: cooling the exhaust gas to a temperature which is below the boiling point of carbon dioxide, and separating the liquid carbon dioxide.

11. The method according to claim 1, wherein carbon dioxide is extracted from the exhaust gas by pressure swing adsorption or a high-temperature membrane.

12. The method according to claim 1, wherein comparatively cold air is admixed to the exhaust gas.

13. The method according to claim 1, wherein the carbon dioxide gas and the oxygen gas are introduced into the converter interior space in separate gas streams.

14. The method according to claim 13, wherein the oxygen gas stream is shielded with a carbon dioxide gas stream.

15. The method according to claim 1, wherein a plurality of converters are operated in parallel, the converters being operated on a cyclic basis and staggered in time.

* * * * *